(12) United States Patent
Németh et al.

(10) Patent No.: US 6,527,259 B1
(45) Date of Patent: Mar. 4, 2003

(54) PNEUMATIC SPRING SYSTEM

(75) Inventors: József Németh, Nyíregyházá (HU);
Zsolt Harsányi, Nyíregyházá (HU);
Zoltán Kriston, Nagykálló (HU);
Attila Szász, Budapest (HU); Gábor Kiglics, Budapest (HU)

(73) Assignee: Phoenix AG, Hamburg (DE)

( * ) Notice: Subject to any disclaimer, the term of this patent is extended or adjusted under 35 U.S.C. 154(b) by 0 days.

(21) Appl. No.: 09/763,796

(22) PCT Filed: Jun. 23, 2000

(86) PCT No.: PCT/DE00/02035
§ 371 (c)(1),
(2), (4) Date: May 1, 2001

(87) PCT Pub. No.: WO01/04509
PCT Pub. Date: Jan. 18, 2001

(30) Foreign Application Priority Data

Jul. 7, 1999 (DE) .......................... 199 31 198

(51) Int. Cl.[7] .................................................. F16F 9/04
(52) U.S. Cl. .............................. 267/64.21; 267/64.24; 267/64.27
(58) Field of Search .......................... 267/64.11, 64.19, 267/64.21, 64.23, 64.24, 64.27, 122

(56) References Cited

U.S. PATENT DOCUMENTS

| | | | | |
|---|---|---|---|---|
| 2,988,353 A | * | 6/1961 | Dietrich .................... | 267/64.24 |
| 4,506,910 A | * | 3/1985 | Bierens .................... | 267/64.21 |
| 4,890,823 A | * | 1/1990 | Koschinat et al. ........ | 267/64.27 |
| 5,060,916 A | * | 10/1991 | Koschinat et al. .......... | 267/122 |
| 5,180,146 A | * | 1/1993 | Schneider et al. .......... | 267/122 |
| 5,535,994 A | * | 7/1996 | Safreed, Jr. ................. | 267/122 |
| 5,707,045 A | * | 1/1998 | Easter ...................... | 267/64.21 |
| 6,024,343 A | * | 2/2000 | Ebert ........................ | 267/124 |
| 6,234,460 B1 | * | 5/2001 | Arnold ....................... | 267/122 |
| 6,250,613 B1 | * | 6/2001 | Koeske et al. .............. | 267/122 |
| 6,386,524 B1 | * | 5/2002 | Levy et al. ............... | 267/64.21 |

FOREIGN PATENT DOCUMENTS

| | | |
|---|---|---|
| DE | 42 13 676 | 10/1993 |
| DE | 295 10 199 | 8/1995 |
| EP | 0 501 043 | 9/1992 |
| EP | 0 864 453 | 9/1998 |

* cited by examiner

Primary Examiner—Jack Lavinder
Assistant Examiner—Robert A. Siconolfi
(74) Attorney, Agent, or Firm—Collard & Roe, P.C.

(57) ABSTRACT

The invention relates to a pneumatic spring system which comprises a pneumatic spring cap and pneumatic cushioning bellows, a pneumatic spring piston with a lateral rolling surface and a base surface that is designed such that a multi-chamber system protrudes into the interior of the pneumatic spring piston. The aim of the invention is to provide a pneumatic spring piston that can be subjected to eccentric loads at a reduced weight and without a holding plate. The multi-chamber system and the fastening system are mounted in such a position that there is maximally one mirror plane perpendicular to the base surface of the pneumatic spring piston, in relation to the piston center axis, and that an eccentric rest surface of the pneumatic spring piston directly contacts the spring carrier.

27 Claims, 4 Drawing Sheets

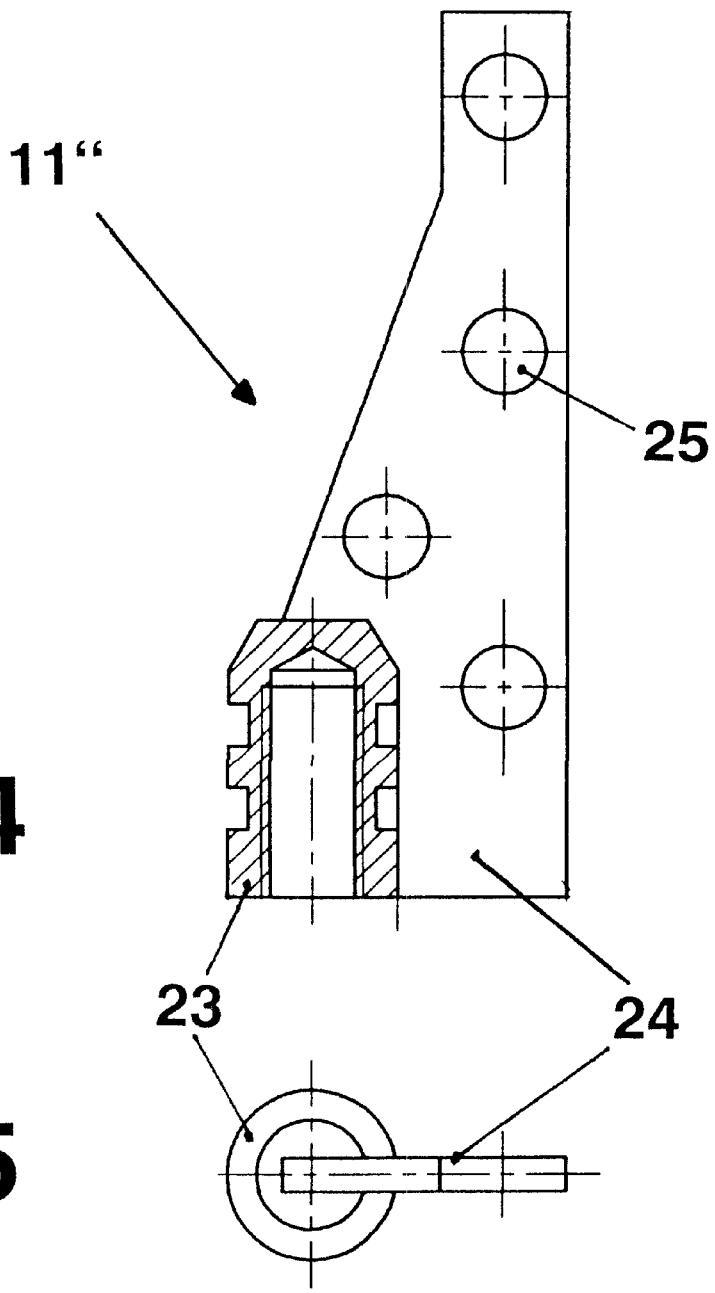

PNEUMATIC SPRING SYSTEM

CROSS REFERENCE TO RELATED APPLICATIONS

Applicants claim priority under 35 U.S.C. §119 of German Application No. 199 31 198.6 filed Jul. 7, 1999. Applicants also claim priority under 35 U.S.C. §120 of PCT/DE00/02035 filed Jun. 23, 2000. The international application under PCT article 21(2) was not published in English.

DESCRIPTION

The invention relates to a pneumatic spring system comprising at least the following structural components, specifically a pneumatic spring cover and a pneumatic spring bellows;

a pneumatic spring piston which in particular is made of plastic or aluminum, and which comprises a face area that is arranged opposite the pneumatic spring cover; a lateral roll-off surface for the pneumatic spring bellows to roll off on, and a base area that is designed in such a way that a multi-chamber system projects into the interior of the pneumatic spring piston;

a first fastening system, which is arranged within the base area of the pneumatic spring piston; as well as a reinforcement, in particular a longitudinal guiding rod or element with which the base of the pneumatic spring piston is anchored by the means of the first fastening system as well as an additional second fastening system.

A pneumatic spring system of said type is described, for example in published patent document EP 0 501 043 B1 (FIG. 2).

The pneumatic spring piston, which is referred to also as the roll-off piston or immersion piston, is made of steel, plastic or aluminum, whereby the two last-mentioned materials are increasingly finding preferred use because of their lower weight as compared to steel. Furthermore, the multi-chamber system of the pneumatic spring piston comprises a ring chamber in most cases, which extends within the edge zone of the base area, forming an annular outer edge and an inner edge; and one or a plurality of core chambers defined by bridges, such core chamber or chambers being arranged within the inner edge of the ring chamber. In addition, the pneumatic spring piston has the largest diameter in most cases within the zone of its base area, so that a widening is formed in this way.

The pneumatic spring pistons known heretofore are constructed in such a way that they have a plurality of mirror planes in conjunction with a central support body. Pneumatic spring pistons that are rotation-symmetrical in relation to the center axis of the piston are known as well.

Now, two variations exist with respect to the stress acting on the pneumatic spring piston:

The pneumatic spring piston is stressed centrically.

The pneumatic spring piston is stressed eccentrically, which is the case in particular in conjunction with a longitudinal guiding rod serving as the spring support. This could be accomplished until now in conjunction with the piston construction described above only with the help of a holding plate made of steel, which is secured on the base of the pneumatic spring piston especially when a pneumatic spring piston made of plastic is used.

Now, the problem of the invention is to provide a pneumatic spring system of the type specified above, in conjunction with which the pneumatic spring piston can be stressed eccentrically while omitting a holding plate and achieving at the same time a reduction of the weight.

Said problem is solved according to the characterizing part of claim 1 in that the multi-chamber system and the first fastening system are arranged in a way such that only one mirror plane at the most is present vertically in relation to the base of the pneumatic spring piston, namely with respect to the center axis of the piston, with formation of an eccentric support surface for the pneumatic spring piston with direct contact with the spring support.

Advantageous design variations of the pneumatic spring system as defined by the invention are specified in claims 2 to 27.

Now, the invention is explained in the following with the help of exemplified embodiments and by reference to five drawings, in which:

FIGS. 4, 5 show two different views of a metal insert consisting of a threaded component and a reinforcing rib.

Figure 1:
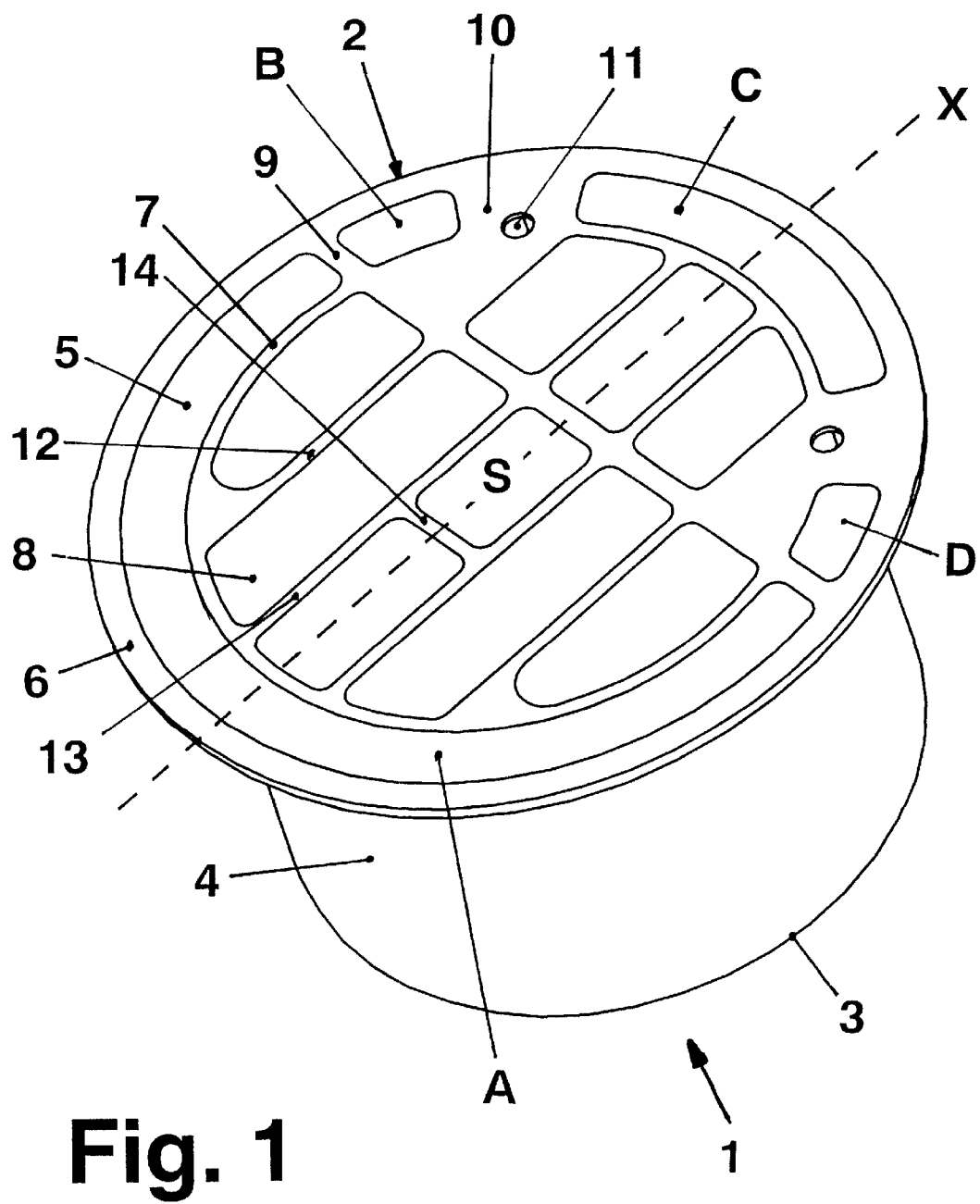
FIGS. 1, 2 show two particularly advantageous construction variations of the multi-chamber system.

The following list of reference numerals and symbols applies in conjunction with said figures:

1,1',1" Pneumatic spring piston
2,2',2" Base area of the pneumatic spring piston
3,3',3" Face area of the pneumatic spring piston
4,4',4" Roll-off surface of the pneumatic spring piston
5,5',5" Ring chamber
6,6',6" Outer edge of ring chamber
7,7',7" Inner edge of ring chamber
8,8',8" Core chambers
9,9' Main bridge
10,10' Fastening bridge
11,11',11" First fastening system
12 Outer bridge (perpendicular to main bridge)
13 Inner bridge (perpendicular to main bridge)
14 Transverse bridge (parallel with main bridge)
15 Outer bridge (inclined relative to main bridge)
16 Inner bridge (inclined relative to main bridge)
17 Head chamber
18 Bridge (with curved shape)
19 Spring arm (longitudinal guiding element)
20 Support surface
21 Bore drilled in spring arm
22 Longitudinal outer edge of spring arm
23 Threaded part of metal insert
24 Reinforcing rib of metal insert
25 Bores within the reinforcing rib

| | |
|---|---|
| A, B, C, D | Ring chamber segments |
| H | Overall height of pneumatic spring piston |
| S | Center axis of piston |
| X | Mirror plane |

FIG. 1 shows a pneumatic spring piston 1 with the base 2, the face 3, the latter being arranged opposite the pneumatic spring cover, as well as with the lateral roll-off surface 4, on which the pneumatic spring bellows can roll off. Within the zone of its base area 2, the pneumatic spring piston has its largest diameter, with formation of a widening. Furthermore, the base area 2 is designed in such a way that a multi-chamber system projects into the interior of the pneumatic spring piston.

The multi-chamber system comprises a ring chamber 5, which is arranged within the marginal zone of the base area 2 with formation of a ring-shaped outer edge 6 and an inner edge 7. Furthermore, several core chambers 8 are present, said core chambers being defined by bridges and being located within the inner edge 7.

The base area 2 of the pneumatic spring piston has a through- and straight-extending main bridge 9, which is connected with the center zone of the base area, but which does not extend through the center axis "S" of the piston. No central support body is provided within the direct zone of the center axis "S" of the piston.

Furthermore, the base area 2 of the pneumatic spring piston has the two fastening bridges 10 with an area size adequate for receiving the first fastening system 11. The two fastening bridge connect in this conjunction the outer edge 6 and the inner edge 7 of the ring chamber 5, specifically with inclusion of the main bridge 9, forming in this manner the four ring segments A, B, C and D.

The main bridge 9 in turn is connected with a system of four bridges extending perpendicular to the main bridge, with formation of the two outer bridges 12 and the two inner bridges 13. Said bridges are arranged in this conjunction with about the same spacing between each other and exclusively extend from the inner wall 7 to the inner wall of the ring chamber 5. The two outer bridges 12 as well as the main bridge 9 each change in this conjunction with a wide surface area into the fastening bridge 10. Furthermore, the two inner bridges 13 are connected by a transverse bridge 14, which extends parallel with the main bridge 10, clamping the center axis "S" of the piston.

The pneumatic spring piston 1 is constructed in such a way that one single mirror plane "X" is present perpendicular to the base area 2, specifically as opposed to the designs known until now.

Figure 2:
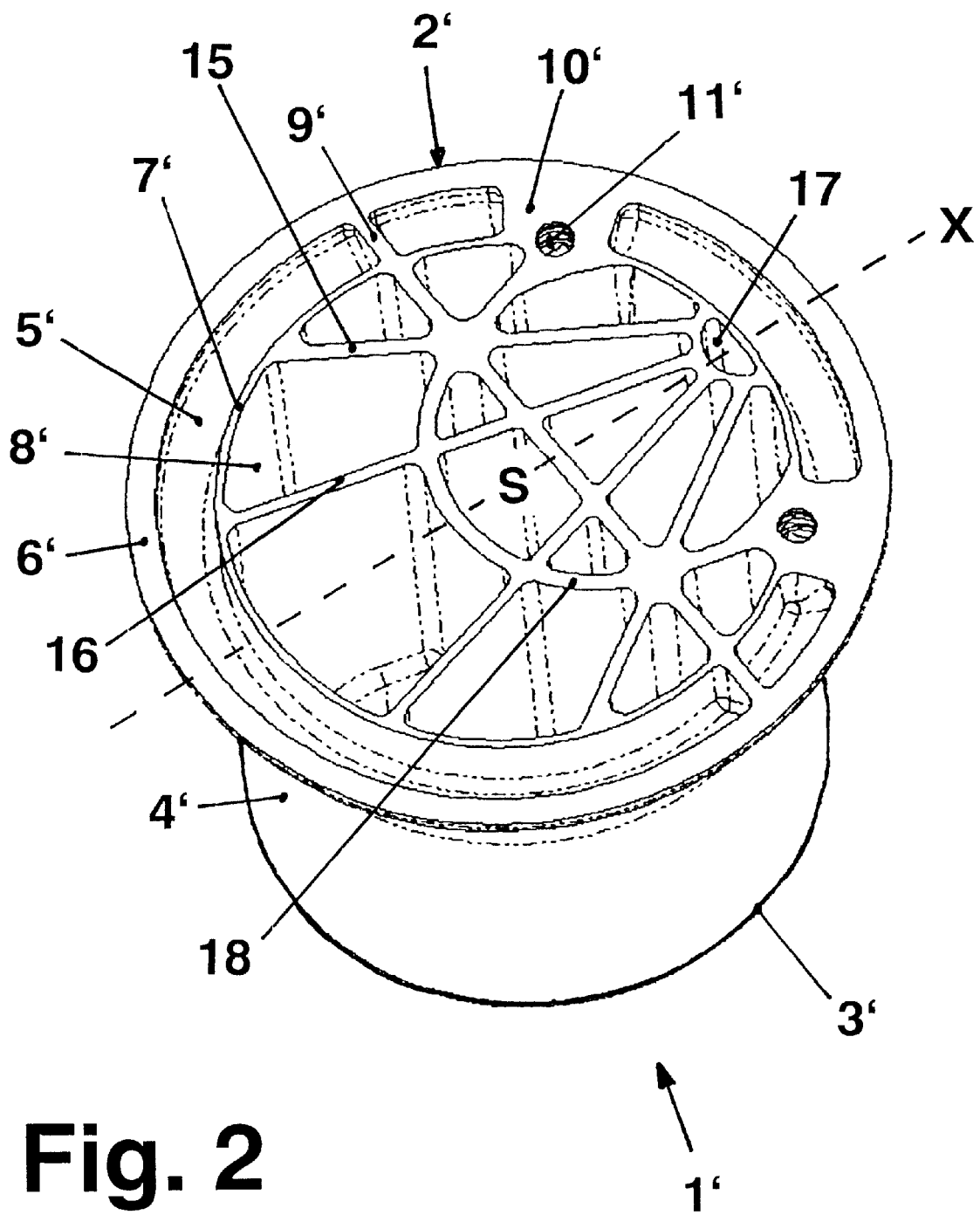

The pneumatic spring piston 1' according to FIG. 2 is different from the pneumatic spring piston 1 according to FIG. 1 in that the core chambers 8' are designed in another way.

A total of four bridges, specifically the two outer bridges 15 and the two inner bridges 16 extend within the inner edge 7' of the ring chamber 5' inclined in relation to the main bridge 9', specifically with formation of a fan-shaped structure. Said four bridges extending in the form of a fan merge in this conjunction in the area of the inner edge 7' of the ring chamber 5' in the form of a common meeting point, whereby a head chamber 17 is present within said meeting point. Said head chamber is outwardly defined by the inner edge 7' of the ring chamber 5'. Said head chamber is located about half way between the two fastening bridges 10'.

Furthermore, the bridges extending in the form of a fan are connected with each other by a bridge 18 extending in a curved manner. Said bridge extends in this conjunction from the fastening bridge 10' to the fastening bridge. Within the area of the two outer bridges 15, the curved bridge 18 furthermore extends through the main bridge 9', with formation of a total of two areas of intersection.

Said pneumatic spring piston 1', too, is constructed in such a way that one single mirror plane "X" is present perpendicular to the base area 2". Furthermore, in the present case, too, no central support body is present within the immediate range of the center axis "S" of the piston.

Figure 3:
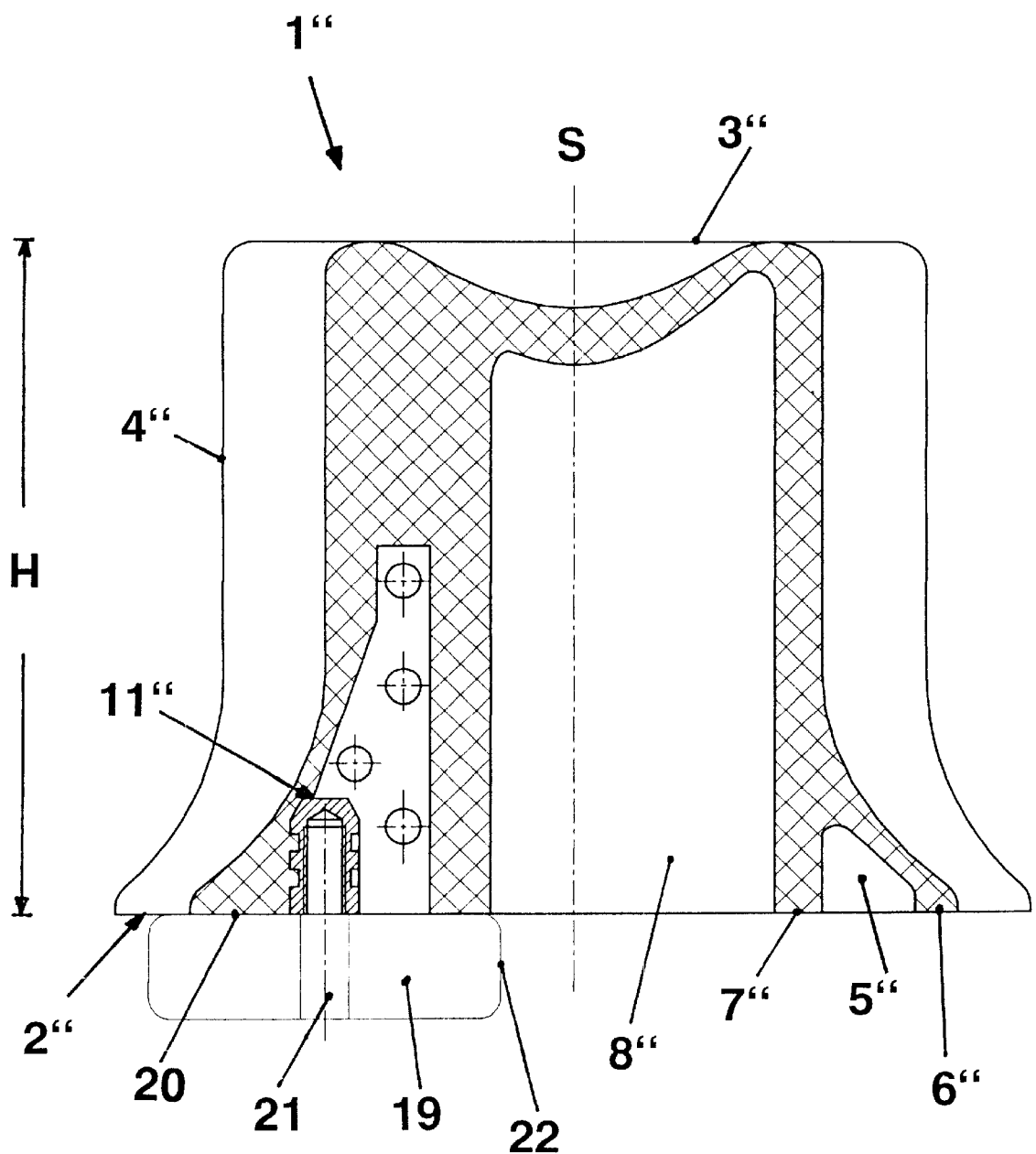
FIG. 3 shows a pneumatic spring piston made of plastic, with a metal insert cooperating with a spring support.

FIG. 3 shows a pneumatic spring piston 1" made of plastic, in particular from glass fiber-reinforced plastic, which rests with direct contact on the spring support 19, which is referred to also as a rocking arm (or rocker). An eccentric support surface 20 is formed in this conjunction with respect to the center axis "S" of the piston, said support surface being part of the base area 2". Said support surface is at the same time the fastening surface because the first fastening system 11" is located within said area. Said first fastening system is connected in a fixed manner with a second fastening system (e.g. a screw) via a drilled hole 21 located in the spring arm 19.

The main bridge 9 (FIG. 1 or 9' (FIG. 2) extends in particular parallel with the longitudinal outer edge 22 of the spring support 19, specifically in a way such that the main bridge is located within the support area 20 of the pneumatic spring piston 1", whereby the edges of the main bridge and the spring support are substantially aligned with each other.

The depth of the core chambers 8" amounts to at least ⅔ of the overall height "H" of the pneumatic spring piston 1".

FIGS. 4 and 5 again show details of the first fastening system 11" according to FIG. 3 viewed from two different aspects.

In the present case, the first fastening system 11" is a metal insert, which in turn consists of a threaded part 23 and a reinforcing rib 24. Furthermore, the reinforcing rib has a number of horizontally extending bores 25.

The fastening system 11" is particularly suited for a pneumatic spring piston made of plastic, whereby the plastic extends through the bores 25 in a material-locked matter. It is possible also to provide for holding ribs instead of using such bores.

The fastening system 11" offers the advantage that the stress within the environment of the threaded part 23 is reduced. Furthermore, the reinforcing rib 24 provides for a reduction in the deformation of the piston, which is important when a plastic material us used. This assures a long useful life of the pneumatic spring system.

If necessary, it is possible also to employ as the first fastening system simple threaded bores or threaded bushes for receiving the second fastening system, especially when a pneumatic spring piston made of metallic materials is used.

What is claimed is:

1. A pneumatic spring system including a pneumatic spring cover, a pneumatic spring bellows made from elastomer material, and at least one fastener for coupling the pneumatic spring bellows to the pneumatic spring cover, the system also comprising the following structural components:
   a) a pneumatic spring piston comprising:
      i) a face area arranged opposite the pneumatic spring cover;
      ii) a lateral roll off surface; wherein the pneumatic spring bellows connects said pneumatic spring piston to the pneumatic cover via the at least one fastener;
   b) a base area having a multi-chamber system that projects into an interior of said pneumatic spring piston, wherein said multi-chamber system comprises a ring chamber extending within an edge zone of said base area, said ring chamber having a ring shaped outer edge and an inner edge, said outer edge defining at least one core chamber;
   c) a fastening system disposed within said base area of said pneumatic spring piston;
   d) a longitudinal guide rod forming a spring support;
   e) at least one additional fastening system disposed within a base area of said pneumatic spring piston, wherein said fastening system and said additional fastening system are used to anchor said longitudinal guide rod to said base area of said pneumatic spring piston;

wherein said multi chamber system of said base area has only one mirror plane that is present and perpendicular to said base area of said pneumatic spring piston wherein said base area has an eccentric support surface with direct contact with said spring support.

2. The pneumatic spring system as in claim 1, wherein said pneumatic spring piston consists of glass fiber reinforced plastic.

3. The pneumatic spring system as in claim 1, wherein said mirror plane is perpendicular to said base area of said pneumatic spring piston.

4. The pneumatic spring system as in claim 1, wherein said pneumatic spring piston does not have a central support body within an immediate range of a central axis of said piston.

5. The pneumatic spring system as in claim 1, wherein said base area of said pneumatic spring piston has a main bridge, wherein said main bridge is connected through a center axis of said piston.

6. The pneumatic spring system as in claim 5, wherein said main bridge extends parallel with a longitudinal outer edge of said spring support, and wherein said main bridge is located within a support area of said pneumatic spring piston, said pneumatic spring piston having a substantially aligned arrangement of said main bridge and said spring support.

7. The pneumatic spring system as in claim 1, further comprising at least one fastening bridge having a sufficient surface area for receiving said fastening system.

8. The pneumatic spring system as in claim 7, wherein said fastening system connects said outer edge and said inner edge of said ring chamber.

9. The pneumatic spring system as in claim 8, wherein said fastening system is disposed in said base area adjacent to said ring chamber.

10. The pneumatic spring system as in claim 1, wherein said at least one core chamber has at least one bridge.

11. The pneumatic spring system as in claim 5, wherein said base area has at least one additional bridge that extends substantially perpendicular to said main bridge.

12. The pneumatic spring system as in claim 5, further comprising at least four bridges extending perpendicular to said main bridge with each bridge being spaced apart from an adjacent bridge by a substantially equal margin.

13. The pneumatic spring system as in claim 12, wherein said at least four bridges are spaced apart from each other to form at least two outer bridges and at least two inner bridges and wherein said spring system further comprises at least one transverse bridge extending parallel with said main bridge and connecting said at least two inner bridges, said main bridge and said at least one transverse bridge forming a chamber enclosing a center axis of said piston.

14. The pneumatic spring system as in claim 13, wherein said at least two outer bridges merge into a fastening bridge.

15. The pneumatic spring system as in claim 5, further comprising a plurality of bridges extending in a fan shaped pattern.

16. The pneumatic spring system as in claim 15, wherein said plurality of bridges comprise four bridges in a form of two outer bridges and two inner bridges.

17. The pneumatic spring system as in claim 15, wherein said plurality of bridges merge into each other adjacent to said inner edge to form a common meeting point.

18. The pneumatic spring system as in claim 11, further comprising a head chamber disposed within said common meeting point, said head chamber being outwardly defined by an inner edge of said ring chamber.

19. The pneumatic spring system as in claim 17, wherein said common meeting point is disposed approximately halfway between said two fastening bridges.

20. The pneumatic spring system as in claim 15, wherein said plurality of bridges extending in a fan shaped pattern are coupled to each other by a curved bridge.

21. The pneumatic spring system as in claim 20, wherein said curved bridge extends from a fastening bridge through said main bridge within a zone of said two outer bridges.

22. The pneumatic spring system as in claim 21, wherein said curved bridge has an intersection area disposed within a zone where said main bridge and said outer bridge meet.

23. The pneumatic spring system as in claim 22, wherein said fastening system comprises at least one simple threaded bore for receiving said at least one additional fastening system.

24. The pneumatic spring system as in claim 1, wherein said fastening system comprises at least two threaded bushes for receiving said at least one additional fastening system.

25. The pneumatic spring system as in claim 24, wherein said at least two threaded bushes are elastic and rounded off.

26. The pneumatic spring system as in claim 22, wherein said pneumatic spring is made from plastic and said fastening system has at least one metal insert for receiving said at least one additional fastening system, wherein said metal insert comprises a threaded component and a reinforcing rib.

27. The pneumatic spring system as in claim 26, wherein said multi-chamber system has a depth that is at least $2/3$ of an overall height of said pneumatic spring piston.

* * * * *